(12) United States Patent
Pestl et al.

(10) Patent No.: US 11,311,105 B2
(45) Date of Patent: *Apr. 26, 2022

(54) SMART VANITY MIRROR SPEAKER SYSTEM

(71) Applicant: Forever Gifts, Inc., Arlington, TX (US)

(72) Inventors: Marcus Pestl, Arlington, TX (US); Hendra Wijaya, Arlington, TX (US)

(73) Assignee: FOREVER GIFTS, INC., Arlington, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,631

(22) Filed: Jan. 18, 2021

(65) Prior Publication Data

US 2021/0137266 A1 May 13, 2021

Related U.S. Application Data

(63) Continuation-in-part of application No. 16/842,721, filed on Apr. 7, 2020, now Pat. No. 10,895,977,
(Continued)

(51) Int. Cl.
*A47B 67/00* (2006.01)
*H04R 1/02* (2006.01)
(Continued)

(52) U.S. Cl.
CPC ............. *A47B 67/005* (2013.01); *A47G 1/02* (2013.01); *G06F 3/017* (2013.01); *G06F 3/041* (2013.01); *G06F 3/147* (2013.01); *G06F 3/167* (2013.01); *G10L 15/22* (2013.01); *G10L 15/26* (2013.01); *H04N 5/2253* (2013.01);
(Continued)

(58) Field of Classification Search
None
See application file for complete search history.

(56) References Cited

U.S. PATENT DOCUMENTS 10,652,447 B1 * 5/2020 Pestl .................... G02B 7/182
10,895,977 B2 * 1/2021 Pestl ................... G06F 3/04845
(Continued)

OTHER PUBLICATIONS

International Search Report and Written Opinion for PCT/US2020/029404, dated May 22, 2020 (6 pages).

*Primary Examiner* — William B Perkey
(74) *Attorney, Agent, or Firm* — Klemchuk LLP

(57) ABSTRACT

A smart vanity mirror speaker system may include a surface-mounted mirror that includes a mirror on one side and a screen display opposite the mirror, and a module capable of capturing, broadcasting, and recording still photos, audio, and video of a user, wherein the mirror is capable of being adjusted in height and angle. The system may include at least one light ring, a companion device/control panel, and/or an external microphone. The system includes an acoustic chamber connected to a bottom portion of the mirror, the acoustic chamber having a speaker integrated within the acoustic chamber. The acoustic chamber may include a downward-facing full-range driver on a lower end of the acoustic chamber; and a passive base isolator on an upper end of the acoustic chamber. The smart vanity mirror speaker system may pair with at least one Bluetooth®-enabled device or MP3 player.

20 Claims, 7 Drawing Sheets

Related U.S. Application Data which is a continuation-in-part of application No. 16/390,178, filed on Apr. 22, 2019, now Pat. No. 10,652,447.

(51) Int. Cl.

| | |
|---|---|
| *G06F 3/041* | (2006.01) |
| *G06F 3/16* | (2006.01) |
| *G06F 3/01* | (2006.01) |
| *H04S 7/00* | (2006.01) |
| *H04R 5/02* | (2006.01) |
| *G10L 15/26* | (2006.01) |
| *G10L 15/22* | (2006.01) |
| *H04N 5/225* | (2006.01) |
| *H04R 3/00* | (2006.01) |
| *H04N 5/247* | (2006.01) |
| *H04N 7/18* | (2006.01) |
| *G06F 3/147* | (2006.01) |
| *A47G 1/02* | (2006.01) |
| *H04R 1/08* | (2006.01) |

(52) U.S. Cl.
CPC ............... *H04N 5/247* (2013.01); *H04N 7/18* (2013.01); *H04R 1/028* (2013.01); *H04R 1/08* (2013.01); *H04R 3/00* (2013.01); *H04R 5/02* (2013.01); *H04S 7/30* (2013.01); *A47B 2220/0077* (2013.01); *A47B 2220/0091* (2013.01); *H04R 2420/07* (2013.01); *H04R 2499/15* (2013.01)

(56) References Cited

U.S. PATENT DOCUMENTS

| | | |
|---|---|---|
| 2004/0246607 A1 | 12/2004 | Watson et al. |
| 2011/0117959 A1 | 5/2011 | Rolston |
| 2016/0248981 A1 | 8/2016 | Paul |
| 2017/0118385 A1 | 4/2017 | Vargas et al. |
| 2017/0164719 A1 | 6/2017 | Wheeler |
| 2017/0257543 A1 | 9/2017 | Rowles |
| 2018/0048791 A1 | 2/2018 | Johnson |
| 2018/0263362 A1 | 9/2018 | Yang |
| 2018/0270410 A1 | 9/2018 | Lyle |
| 2019/0003699 A1 | 1/2019 | Mondora |
| 2021/0137266 A1* | 5/2021 | Pestl ...................... G10L 15/26 |

* cited by examiner

SMART VANITY MIRROR SPEAKER SYSTEM

CROSS-REFERENCE TO RELATED APPLICATIONS

The present application is a continuation-in-part of U.S. application Ser. No. 16/842,721, filed Apr. 7, 2020, entitled "Smart Vanity Mirror Speaker System," which is a continuation-in-part of U.S. application Ser. No. 16/390,178, filed Apr. 22, 2019, entitled "Selfie Mirror Speaker," the disclosures of which are incorporated by reference in their entirety.

TECHNICAL FIELD

The present disclosure relates, in general, to a mirror and speaker system, and more specifically, to a smart vanity mirror speaker system.

BACKGROUND

Mirrors can provide a reflection that may not produce a desirable self-portrait type image, more commonly known as a selfie. Conventionally, mirrors may not include smart technology and may not provide a speaker for optimizing use of the mirror without requiring multiple devices. Neither conventional nor smart mirrors display an enhanced image of a user on their surface that is generated by a camera and enhanced by various filters so that the user's appearance is enhanced. Other convenience features, such as voice- or gesture-operated swiveling of a double-sided make-up mirror, are also noticeably absent from mirrors in the market. In addition, features such as the addition of a handheld companion electronic device that can be used to control the smart mirror while also functioning as a beauty tool that can deliver treatments such as skin phototherapy and access to a virtual community of users are also absent from the market for mirrors.

SUMMARY

Embodiments of the present disclosure may provide a smart vanity mirror speaker system, the system comprising: a surface-mounted mirror comprising: a mirror on a first side; a screen display on a second side opposite the first side; one or more modules capable of capturing, livecasting, projecting, and recording a plurality of still images and photos, non-visible (UV) and heat spectrum images, polarization images, 3D images, audio inputs, and video of a user; and a swivel that connects to a single point or a plurality of sides of the surface-mounted mirror, and provides for rotational adjustability of the surface-mounted mirror. The system also may include a structure connected to the surface-mounted mirror, the structure provided with means to adjust a position of the surface-mounted mirror and housing one or more acoustic chambers, the one or more acoustic chambers having one or more audio output devices integrated within the one or more acoustic chambers; at least one light source; and one or more companion devices connected wirelessly or electronically tethered but physically separable from the surface-mounted mirror, the one or more companion devices provided with means to control functions being communicated by visual or other means to the user, wherein images projected or displayed on the screen display may be generated by one or more imaging devices that may be configured to be physically adjustable and may be mounted in a plurality of positions behind, and in proximity to, the screen display and within and to the one or more companion devices, and wherein the surface-mounted mirror may be capable of being adjusted at least in height and rotation relative to the structure housing the one or more acoustic chambers. The system may further include one or more microphones connected wirelessly or electronically tethered but physically separable from the surface-mounted mirror and provided with means to enhance capture, broadcasting, and recording of voice and audio inputs to accompany and contextualize at least one of the plurality of still images and photos, non-visible and heat spectrum images, 3D images, audio inputs, and video of the user. The screen display may be touch-enabled. The at least one light source may surround the surface-mounted mirror. The screen display may rotate within the at least one light source upon one or more of voice activation and gesture activation. The at least one light source may be separated from the surface-mounted mirror. The screen display may be provided with means to apply one or more of augmented reality (AR), polarization filters, and audio filters to at least one of the plurality of still images and photos, non-visible and heat spectrum images, 3D images, audio inputs, and video of the user. At least one of the one or more companion devices may be controlled by one or more means including physical buttons, a touchpad, voice control means, and gesture control means. The one or more companion devices may provide means to select and operate screen display functions that may be available to the user comprising: display screen zoom; selection and application of AR filters; selection and application of audio filters; display screen image color temperature adjustment; commencing and terminating user skin analysis; capturing display screen images; commencing and terminating video recording and livecasting; audio capture; commencing and terminating voice calls; interactive chat options; viewing any content pushed to or acquired by the screen display; and scrolling and selecting control options displayed on the screen display, without requiring the user to have physical contact with one or more of the surface-mounted mirror, the structure, and the at least one light source. The one or more companion devices may further comprise: a magnifying mirror attachment provided with means to attach to at least one of the mirror of the surface-mounted mirror, the surface display, the structure, and the at least one light source. The one or more companion devices may function as a handheld beauty tool capable of delivering hair and skin therapies and beautification delivered by means comprising one or more of light therapy, ultrasonic facials, phototherapy, electrolysis, laser therapy, dermabrasion, mechanical action, product delivery and application, and makeup removal. The one or more companion devices may function as a projector with a system of lenses for projecting rays of light to display an image or video on any surface. The one or more companion devices may further comprise: one or more speakers that may be capable of wirelessly connecting to the one or more audio output devices to create at least one of a stereo- and a surround sound transmission experience. The at least one light source may be controlled by a least one of a touch slider and gesture control means located intuitively to the at least one light source. The at least one light source may be adjustable on one or more axes. The at least one light source may move in concert with the surface-mounted mirror. At least partial movement of the surface-mounted mirror may be voice-activated. Image capture functionality may be mounted in the at least one light source. The system may include an application interface to present the same visual and aural content at the same time to all users of a virtual community, including visually to the user who is livecasting, and the livecasting user also additionally may see the same content displayed on the screen display. The application interface may include one or more buttons to use to capture a selfie, start video recording or livestreaming, select video that is livestreaming (or archived) by the user or by another user, communicate with other users through messaging, share content with other users/members of the virtual community, or other virtual communities that are known destinations where users post content, and/or report or flag inappropriate content posted by other users. The application interface may translate words spoken by a livestreaming user into text lines that may be displayed in real-time on the screen display of the surface-mounted mirror.

Embodiments of the present disclosure may provide a selfie mirror speaker, the speaker comprising: a surface-mounted mirror that may include a module capable of capturing, broadcasting, projecting, and recording still photos, audio, and video of a user; and at least one mirror light, wherein the mirror may be capable of being adjusted in height and angle for viewing, demonstrating, documenting, and sharing use and application of cosmetics, grooming techniques, skincare products, and related tools and accessories. The speaker also may include a base connected to a bottom portion of the mirror, the base having a sound chamber (sometimes referred to as an acoustic chamber) in the interior of the base with a speaker integrated within the acoustic chamber. The mirror may be a dual-sided mirror with one side of the mirror providing a magnification. The speaker may further include a swivel that may connect to each side of the mirror and a top portion of the base to provide adjustability of the mirror. The at least one mirror light may be dual-sided. The speaker may further include a motion sensor that may activate the at least one mirror light. The motion sensor may be activated using infrared (IR) light. The motion sensor may activate other functionalities of the selfie mirror speaker. The at least one mirror light may have flash ring capability. The speaker also may include at least one night light having more than one solid light setting. The camera may have video resolution of 1080P when transmitting to a device and video resolution of 720P when livestreaming video. The speaker may further include a selfie button on the base or the acoustic chamber, thereby providing a single button for the user to touch to take a selfie photo and/or livestream video. The acoustic chamber may further include a downward-facing full-range driver on a lower end of the sound chamber; and a passive base isolator on an upper end of the sound chamber. The selfie mirror speaker may be physically connected using auxiliary audio cable or pair wirelessly with at least one Bluetooth®-enabled device or MP3 player.

Other embodiments of the present disclosure may provide a selfie mirror speaker, the speaker comprising: a surface-mounted mirror including a module capable of capturing, broadcasting, and recording still photos, audio, and video of a user; and at least one mirror light, wherein the mirror may be capable of being adjusted in height and angle for viewing, demonstrating, documenting, and sharing use and application of cosmetics, grooming techniques, skincare products, and related tools and accessories. The speaker also may include a base connected to a bottom portion of the mirror, the base having an acoustic chamber in the interior of the base comprising: a downward-facing full-range driver on a lower end of the acoustic chamber; and a passive base isolator on an upper end of the acoustic chamber. The acoustic chamber may be a self-contained box within the interior of the base. The full-range driver may be an inverted 3-inch dynamic driver 202 and the passive base isolator may be an upward-facing 2-inch passive bass isolator. The acoustic chamber may provide a 5 W speaker output. The selfie mirror speaker may pair with at least one Bluetooth®-enabled device or MP3 player.

Further embodiments of the present disclosure may provide a selfie mirror speaker comprising a surface-mounted mirror including a module capable of capturing, broadcasting, projecting, and recording still photos, audio, and video of a user; and at least one mirror light, wherein the mirror may be capable of being adjusted in height and angle for viewing, demonstrating, documenting, and sharing use and application of cosmetics, grooming techniques, skincare products, and related tools and accessories. The projector may include a system of lenses for projecting rays of light to display an image or video on any surface. The speaker may include a base connected to a bottom portion of the mirror, the base having an acoustic chamber in the interior of the base with a speaker integrated within the acoustic chamber, wherein the selfie mirror speaker may pair with at least one Bluetooth®-enabled device or MP3 player. The speaker may further include at least one microphone, wherein the selfie mirror speaker may include Bluetooth® capability to allow for hands-free calling using the at least one microphone of the selfie mirror speaker.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Embodiments of the present disclosure may generally provide a selfie mirror speaker that may provide a camera functionality to enable a user to take selfie photos and/or livestream video using the selfie mirror speaker. The selfie mirror speaker also may include a sound chamber (sometimes referred to as an acoustic chamber) in the base that provides a speaker.

Figure 1:
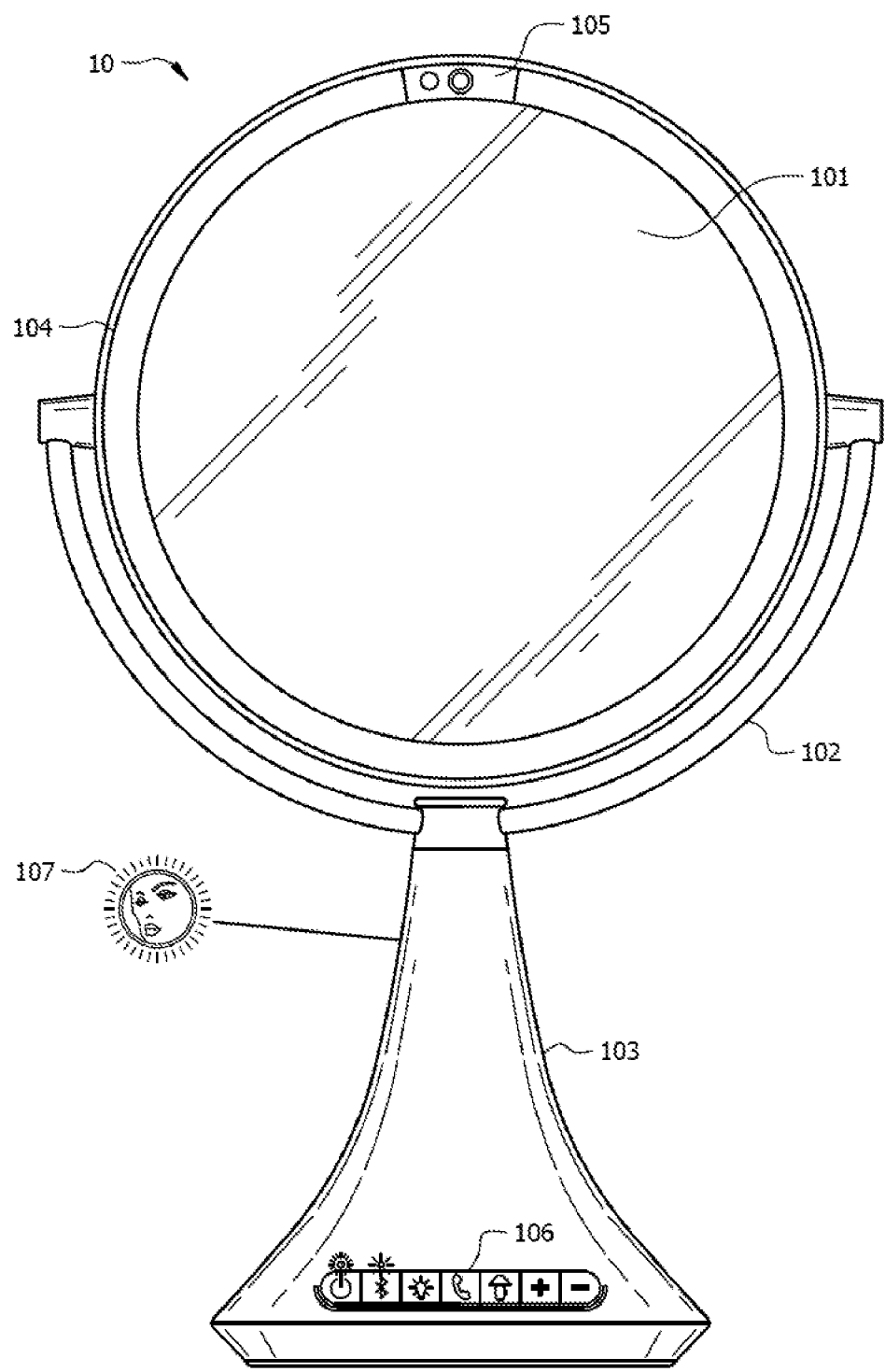
FIG. 1 is a perspective view of a selfie mirror speaker according to an embodiment of the present disclosure.

FIG. 1 depicts selfie mirror speaker 10 according to an embodiment of the present disclosure. Selfie mirror speaker 10 may include mirror 101. Mirror 101 may include dual-sided mirrors that may be approximately 8 inches in diameter. However, the diameters of mirror 101 may be larger or smaller without departing from the present disclosure, or any other geometric or asymmetric shape including round. In an embodiment of the present disclosure, mirror 101 may provide 1× and 5× magnification; however, additional and/or other magnifications may be provided without departing from the present disclosure. It should be appreciated that one side of mirror 101 may not include magnification while the reverse side of mirror 101 may be rotated toward the user to provide a magnified view in embodiments of the present disclosure.

Figure 3:
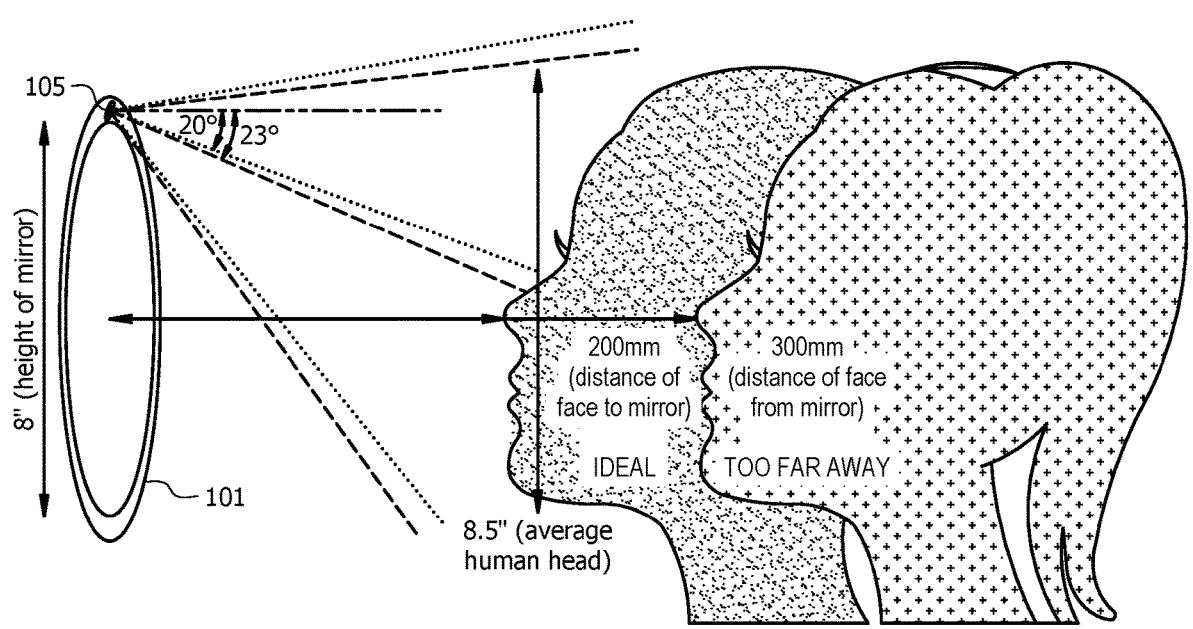
FIG. 3 depicts adjustability of a selfie mirror speaker according to an embodiment of the present disclosure.

Mirror 101 may provide adjustability, such as in rotating mirror 101 to provide for magnification as previously described. Further, as depicted in FIG. 3, mirror 101 may be adjusted in height and/or distance from the user in embodiments of the present disclosure. In an embodiment of the present disclosure, mirror 101 may be approximately 8 inches in height and approximately 200-250 mm or approximately 8-10 inches' distance from the user. FIG. 3 also depicts an optimal (or ideal) angle for camera 105 of mirror 101 to be positioned relative to a user. In an embodiment of the present disclosure, camera 105 may be positioned at an angle of approximately 20-23 degrees, although any angle of camera or lens positioning may apply and the camera angle may be adjustable by the user. Adjustability of the mirror may be provided through swivel 102 that may connect to the sides of mirror 101 and the top portion of base 103. Selfie mirror speaker 10 also may provide telescoping adjustability through base 103, such as to adjust the height and/or angle of positioning of mirror 101, in embodiments of the present disclosure.

Selfie mirror speaker 10 may include at least one mirror light 104, which may be an 8 W LED at 4200K in an embodiment of the present disclosure. While an LED light may be described herein to form at least one mirror light 104, it should be appreciated that other lights may be incorporated into selfie mirror speaker 10 without departing from the present disclosure. At least one mirror light 104 may be dual-sided in an embodiment of the present disclosure so that there may be light to illuminate mirror 101 regardless which side of mirror 101 faces the user. However, there could be other embodiments of the present disclosure where at least one mirror light 104 may be single-sided, whether on the side of mirror 101 that is standard or the side that may provide magnification.

In some embodiments of the present disclosure, at least one mirror light 104 may be manually turned on and off; however, there may be other embodiments of the present disclosure where at least one mirror light 104 may be turned on and off through a motion sensor incorporated within selfie mirror speaker 10. If a motion sensor is used, at least one mirror light 104 may be activated from a range of approximately 120 degrees; however, the range may be larger or shorter without departing from the present disclosure. The range near distance may be approximately 0.328 feet or 0.1 m, and the range far distance may be approximately 3.28 feet or 1 m in embodiments of the present disclosure. However, the range near and far distances may differ without departing from the present disclosure. The motion sensor may be operated using infrared (IR) light to detect motion and turn on at least one mirror light 104 or activate other functionalities of selfie mirror speaker 10 in embodiments of the present disclosure; however, other methods to detect motion to activate at least one mirror light 104 or other functionalities of selfie mirror speaker 10 may be utilized without departing from the present disclosure.

At least one mirror light 104 may have adjustable brightness in embodiments of the present disclosure. On the camera-side of selfie mirror speaker 10, at least one mirror light 104 may have flash ring capability (FIG. 1), such that mirror 101 of selfie mirror speaker 10 may provide even illumination with few shadows visible in the resulting video and/or photographs because the origin of the light is very close to (and surrounds) the optical axis of the lens provided within selfie mirror speaker 10.

In addition to at least one mirror light 104, selfie mirror speaker 10 may include at least one night light as part of or in addition to at least one mirror light 104. In embodiments of the present disclosure, at least one night light may include three solid light settings (red, green, blue); however, more or fewer light settings having different colors may be provided without departing from the present disclosure. Embodiments of the present disclosure also may provide for color-changing lights including, but not limited to, white, red, blue, green, magenta, amber, aqua, and purple. Other colors may be included without departing from the present disclosure.

Selfie mirror speaker 10 may include camera 105 having the capability of taking photographs and/or livestreaming video in embodiments of the present disclosure. The video resolution may be 4K, 1080P or any other resolution when transmitting to a device, such as a mobile electronic device, or 720P when livestreaming video. The video aspect ratio may be 16:9 in an embodiment of the present disclosure. Still resolution may be 2 megapixels (MP) with a still aspect ratio of 16:9 in an embodiment of the present disclosure, or any resolution. The focal length may be 5.7 mm in an embodiment of the present disclosure. While the focal length is not adjustable in an embodiment of the present disclosure, it should be appreciated, however, there may be embodiments of the present disclosure where the focal length may be adjustable. While certain resolutions, focal lengths, and aspect ratios may be provided herein, it should be appreciated that other resolutions, focal lengths, or aspect ratios may be provided without departing from the present disclosure. More than one camera or lens may be provided in the device with control options provided for the user to be able to select which camera or lens they wish to use without departing from the present disclosure.

It should be appreciated that selfie mirror speaker 10 may provide a plurality of controls or buttons 106 in base 103 that may be utilized to turn the power on or off, connect and disconnect Bluetooth pairing, adjust magnification, light strength, color, angles, volume, and other aspects of selfie mirror speaker 10 in embodiments of the present disclosure. While controls or buttons 106 are depicted in FIG. 1, it should be appreciated that more, fewer, or different controls or buttons may be provided in base 103 without departing from the present disclosure. It also should be appreciated that controls or buttons 106 may be provided in a location on selfie mirror speaker 10 other than in base 103 without departing from the present disclosure.

Selfie button 107 may be provided on base 103 in embodiments of the present disclosure. Selfie button 107 may allow a user to touch a single button to take a selfie and/or livestream video. While selfie button 107 is depicted as being positioned on the backside of base 103 in FIG. 1, it should be appreciated that selfie button 107 may be positioned in a different location on selfie mirror speaker 10 without departing from the present disclosure.

Figure 2A:
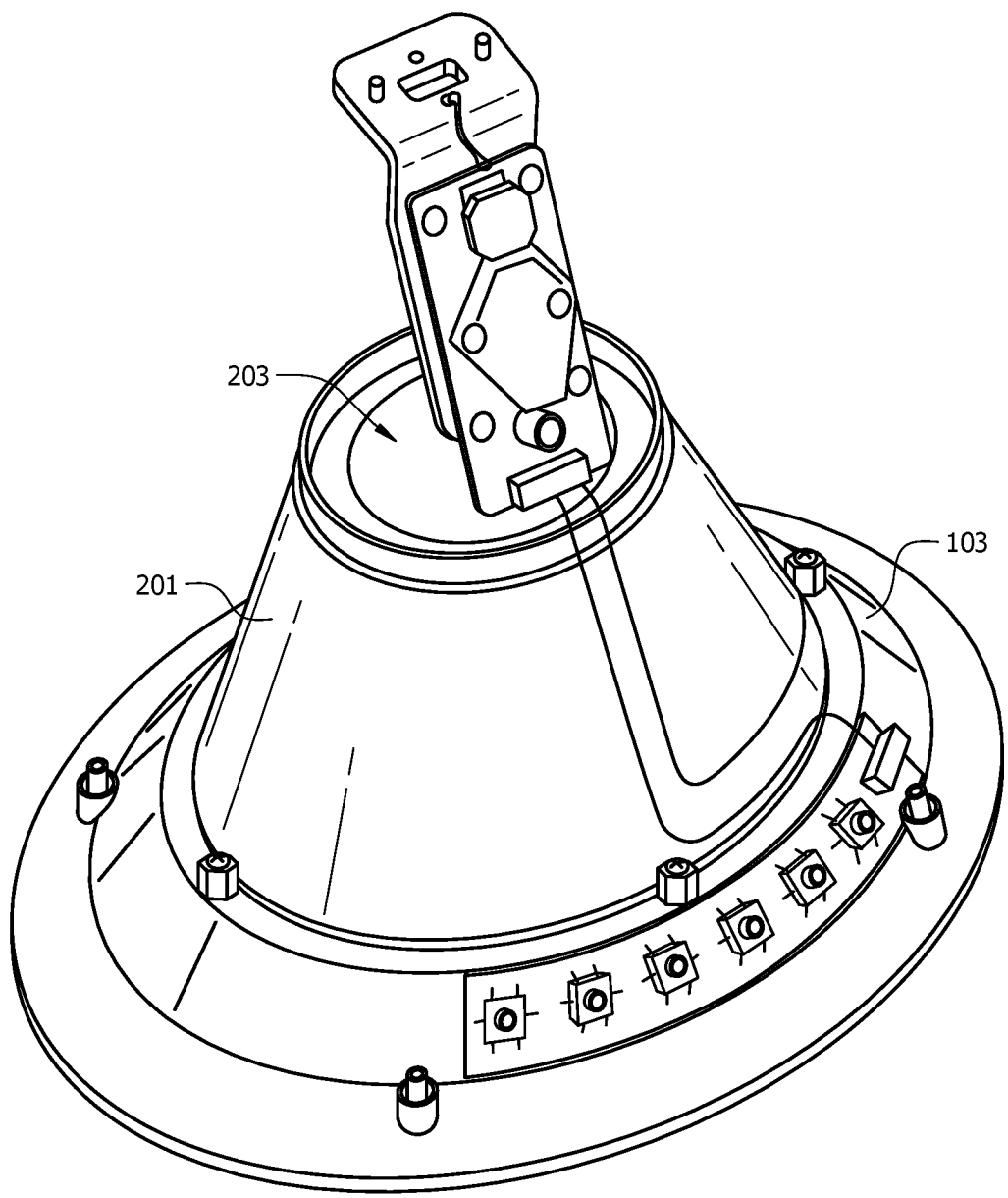
FIG. 2A is a perspective view of a base of a selfie mirror speaker according to an embodiment of the present disclosure.
Figure 2B:
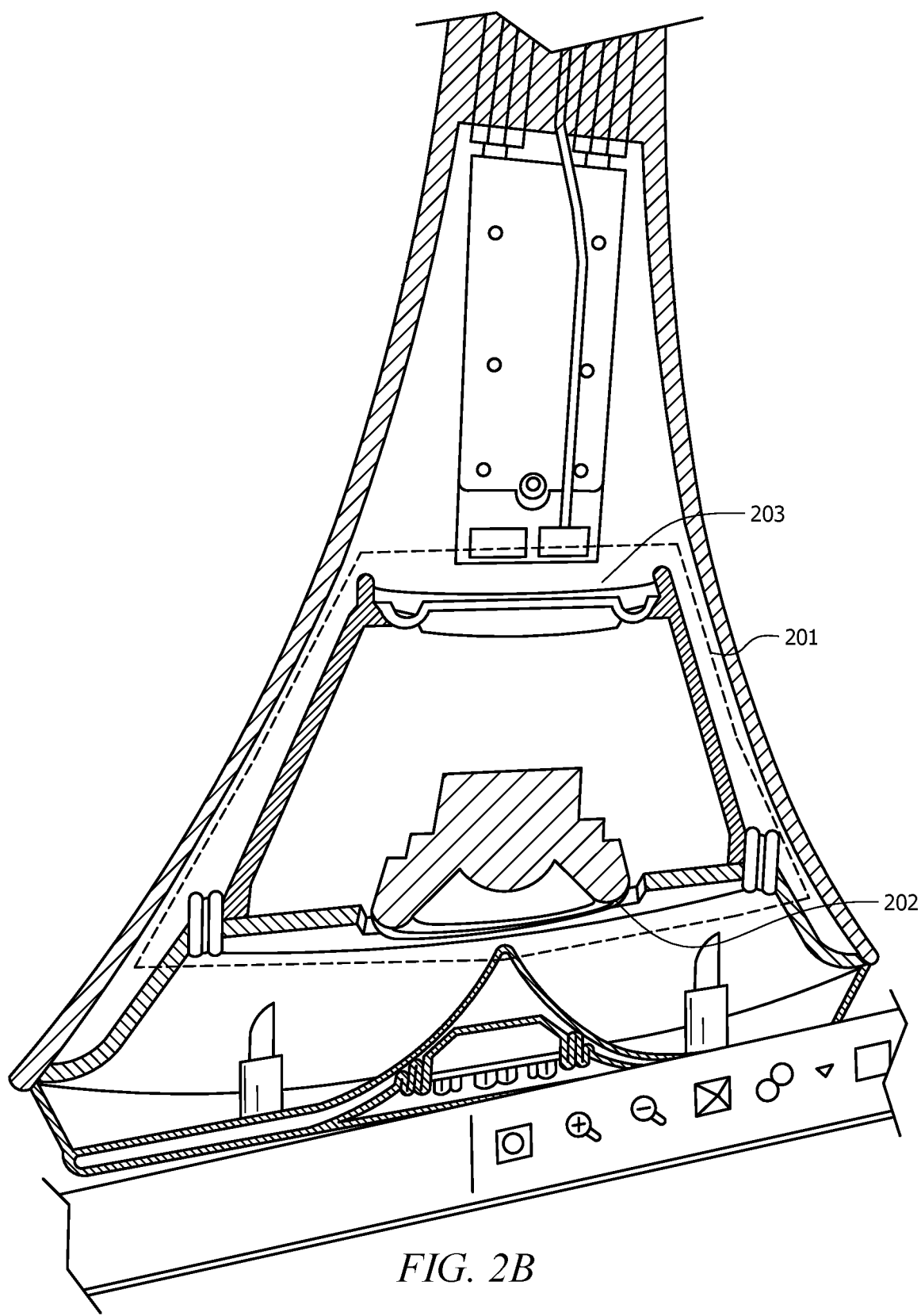
FIG. 2B is an exploded view of the acoustic chamber in the base of FIG. 2A according to an embodiment of the present disclosure.

FIG. 2A is a perspective view of base 103 of a selfie mirror speaker according to an embodiment of the present disclosure. FIG. 2B is an exploded view of sound chamber 201 in base 103 of FIG. 2A according to an embodiment of the present disclosure. Sound chamber 201 may be provided in an interior of base 103 of selfie mirror speaker 10 to house the one or more speakers. Accordingly, base 103 itself may house sound chamber 201 and may provide a self-contained speaker chamber/sound box (i.e., a box-in-a-box). This construction may create a more rigid box to transmit sound than base 103 may be able to transmit on its own. Sound chamber 201 may include full-range driver 202 on one end and base isolator 203 on the other end. Without sound chamber 201 housed in base 103 according to embodiments of the present disclosure, sound quality may suffer because main speaker driver 202 according to embodiments of the present disclosure faces downward. The opposite side of sound chamber 201 may include passive bass isolator 203 to further enhance bass sound and overall sound quality. Thus, sound transmission may be improved due to the self-contained nature of sound chamber/box 201 within base 103. It should be appreciated that a plurality of sound chambers with a plurality of sound output characteristics may be provided without departing from the present disclosure.

Selfie mirror speaker 10 may include a 5 W speaker output in an embodiment of the present disclosure. The speaker output may provide inverted 3-inch dynamic driver 202 and upward-facing 2-inch passive bass isolator/radiator 203 in embodiments of the present disclosure. The speaker drivers and layout also may include a full range 5 W dynamic driver and passive bass radiators in an embodiment of the present disclosure.

The body of selfie mirror speaker 10 may be formed of plastic, such as acrylonitrile butadiene styrene (ABS). The light ring may be formed of acrylic, such as poly-methyl methacrylate (PMMA). The speaker grill may be formed of steel. Silicone may be used to form the control panel and covers for selfie mirror speaker 10. The at least one mirror may be formed of glass, while the frame and arm of the at least one mirror may be formed of steel. While different materials are described herein, it should be appreciated that other materials may be used without departing from the present disclosure.

It should be appreciated that selfie mirror speaker 10 may pair with any Bluetooth®-enabled device, including but not limited to, a tablet, a laptop or other computer, a smart phone (IOS or Android), MP3 players, and/or other mobile electronic devices. Accordingly, audio sources may include Bluetooth-enabled devices and/or MP3 players. However, it should be appreciated that MP3 players may be limited to 3.5 mm auxiliary audio cable input in some embodiments of the present disclosure. Selfie mirror speaker 10 may include Bluetooth® version 5.0+BR+EDR with an approximately 33 foot/10 m connection range according to an embodiment of the present disclosure. It also should be appreciated that inclusion of Bluetooth® capability in selfie mirror speaker 10 may allow for hands-free calling in embodiments of the present disclosure.

Total harmonic distortion (THD) plus Noise may be less than approximately 10% in embodiments of the present disclosure. The signal to noise (S/N) ratio may be more than approximately 95 dB in embodiments of the present disclosure. The frequency response may be approximately 120 Hz-20 KHz (−10 dB) in embodiments of the present disclosure. Various audio formats may be supported including, but not limited to, high-efficiency advanced audio encoding (HE-ACC), low-complexity advanced audio encoding (LC-ACC), MP3, Vorbis, WAV linear pulse code modulation (LPCM), and free lossless audio codec (FLAC). Other audio formats may be supported without departing from the present disclosure. Streaming quality may be approximately 16 bit/48 kHZ in embodiments of the present disclosure.

Figure 5:
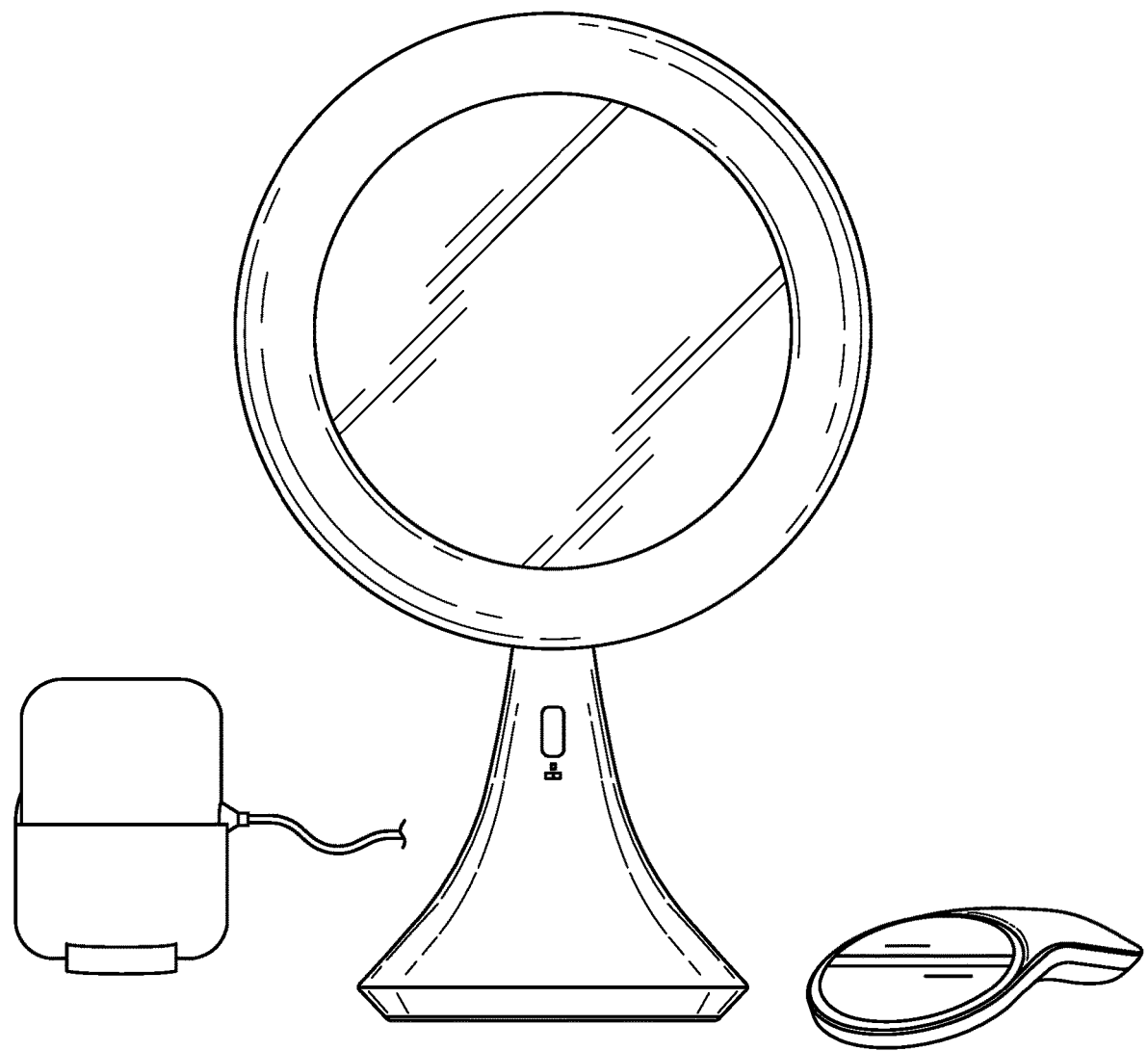
FIG. 5 depicts a mirror with a companion device according to an embodiment of the present disclosure.

Selfie mirror speaker 10 may further include at least one microphone that may have near-field (×1) range and may have a range of approximately 1.7 feet/0.5 m in an embodiment of the present disclosure. However, there may be embodiments of the present disclosure where the at least one microphone may have a range other than near-field and/or have a different range distance without departing from the present disclosure. The at least one microphone also may have a background noise limit of approximately 35 dB in an embodiment of the present disclosure; however, the background noise limit may be adjusted up or down without departing from the present disclosure. In some embodiments of the present disclosure, a separate microphone (i.e., separate from selfie mirror speaker 10), either wireless or corded, may be used to enhance the quality of voiceover when a user is recording, transmitting or streaming video and images from selfie mirror speaker 10, such as depicted in FIG. 5.

Selfie mirror speaker 10 may also include at least one USB connection (1×2.1 A) in an embodiment of the present disclosure. Selfie mirror speaker 10 may further include a charging cable/cord, which may be a 12V, 4 A adaptor (6 feet/183 cm) in an embodiment of the present disclosure.

Figure 4:
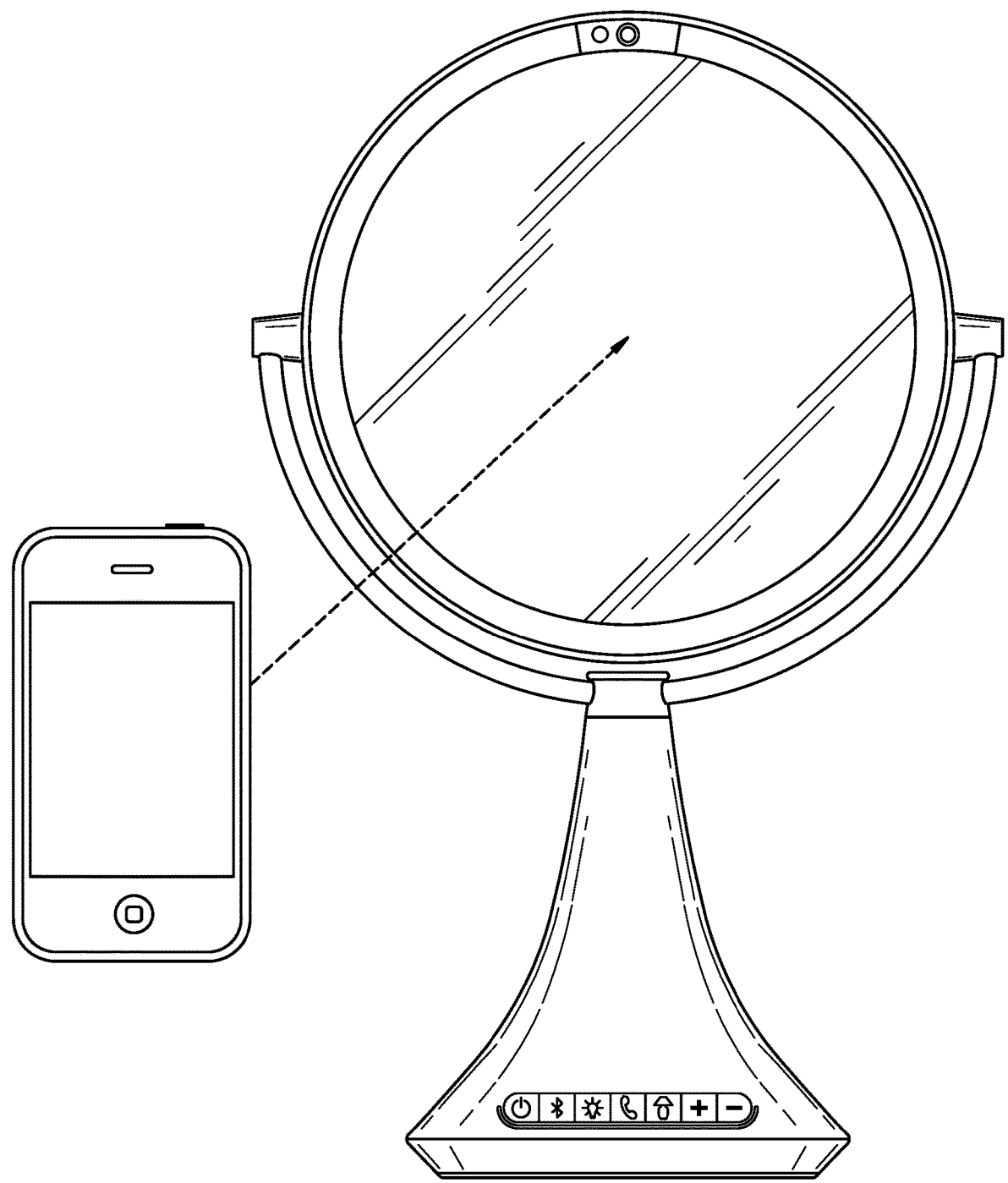
FIG. 4 is a perspective view of a mirror according to an embodiment of the present disclosure.

FIG. 4 is a perspective view of a mirror according to an embodiment of the present disclosure. In this embodiment, the mirror may include a screen display, similar to that of a smartphone display, that may be round, ovoid, square, rectangular, or any other shape. The image that may be seen on the screen display may be generated by a camera, or a plurality of cameras, or may be a liquid crystal display (LCD) screen, mounted in any of fixed or adjustable positions that may be located near the screen display or behind the screen display. The screen display may be touch or non-touch-enabled in embodiments of the present disclosure. The screen display may be double-sided with a mirror or other display/reflective element on the other side. There also may be embodiments of the present disclosure where there may not be a mirror or reflective element on the reverse side. This screen display may spin in a fixed light ring so it can present either side to a user. This spin feature may be voice-activated, and other features may be voice-activated as well in embodiments of the present disclosure.

Inclusion of a screen display on one side of the mirror as depicted in FIG. 4 may allow the screen display to act as a mirror when the user looks in the camera. Further, the screen display may provide additional features that a mirror cannot, including, but not limited to, zoom and display of non-visible spectrum images. The screen display may incorporate augmented reality (AR) filters that may mask wrinkles and spots, and may reveal underlying skin structure not visible to the naked eye. Light filters also may be added more effectively using a screen display according to embodiments of the present disclosure. The screen display also may transfer mobile interactivity to the mirror and may even provide commercial opportunities, such as selling ad space.

FIG. 5 depicts a mirror with a companion device, such as a control panel, according to an embodiment of the present disclosure. The companion device may be used to control functions being shown to the user on the screen display via an application. This may bridge the gap between users who may not be comfortable with voice control and removing the control panel of the mirror entirely due to the replacement of primary physical controls by voice control actuation. The companion device may be connected remotely (i.e., wirelessly) or tethered to the mirror through a connection cable. The companion device may be used as a control tool for screen display functions. In an embodiment of the present disclosure, the companion device may be a touchpad; however, other companion devices may be used without departing from the present disclosure. Screen display functions may include, but are not limited to, zoom (i.e., zoom in and out the view of user's face on the screen display), selection of AR filters, color temperature adjustment, a selfie trigger, and scrolling options without the user having to lean forward to operate the mirror. Scrolling options may appear on the screen display and may include, but are not limited to, virtual makeup selections or filters to enhance the user's image. The companion device may include a magnifying mirror attachment that may be magnetically attached to the mirror on the reverse side of the screen display in an embodiment of the present disclosure.

In another embodiment of the present disclosure, the separate control panel may function as a handheld beauty tool that may be capable of delivering skin therapies, such as light therapy/phototherapy. This tool may include a mirror so it can be used as a handheld mirror to see the back and sides of a user's head/body by using the mirror, or any mirror in conjunction with it. Accordingly, the tool may function as an additional mirror, whether anchored to the main mirror, or handheld.

The separate companion device panel may include a speaker that may connect to the speaker in the mirror itself to create a stereo-sound experience. True Wireless Sound (TWS) may be provided through such a speaker, thereby providing an audio improvement, or any one of a combination of different speaker frequencies or output ranges that enhance audio delivery by providing separate speakers to output different frequency ranges of the same audio inputs. The control panel may also be configured to control a plurality of mirror functions, including but not limited to, light brightness and color temperature control, movement up and down if the stem is telescopic, etc.—regardless whether function control buttons are present on the mirror itself.

The companion device may provide for commencing and terminating user skin analysis in an embodiment of the present disclosure. User skin analysis may be an artificial-intelligence (AI) comparison to a database of skin types of varying age and condition. Three photographs of the user may be captured to be compared: daylight (natural) lighting; cross-polarization filter; and ultraviolet (UV) light filter. Comparison and evaluation may be performed to summarize the user's skin quality in different categories: wrinkles, UV damage, texture, pores, general spots, brown spots (sun-spots), red areas (inflammation), and porphyrins (acne-causing bacteria secretions). Each may be visualized for the user, and the skin analysis may compare the user's skin with a database to predict the user's age and/or recommend makeup type/color/amount to be applied in embodiments of the present disclosure.

Figure 6:
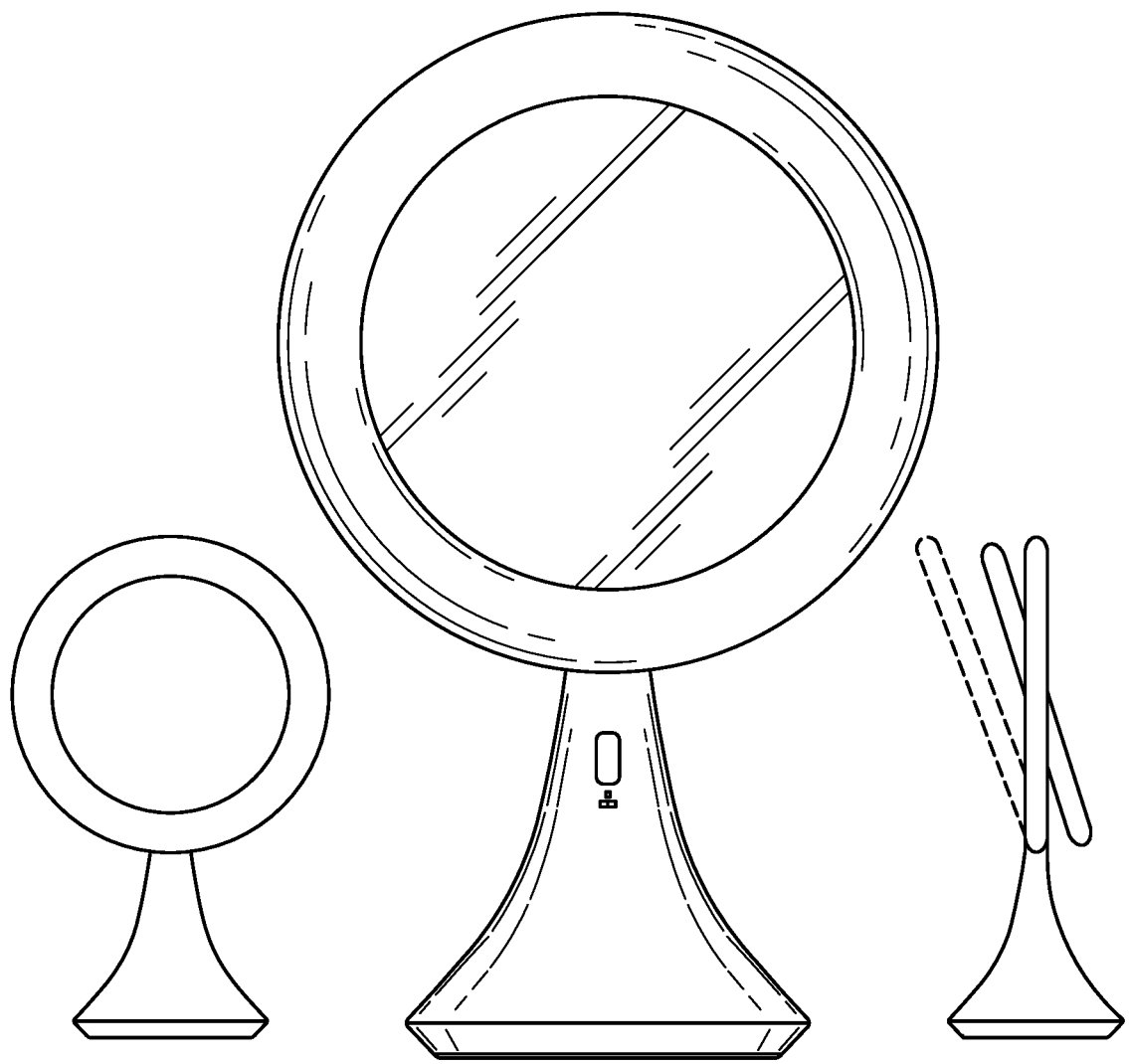
FIG. 6 depicts a mirror and a light ring according to an embodiment of the present disclosure.

The companion device also may include a spotlight (or light ring) that may be used to highlight areas when performing tasks that may require more light, such as brow tweezing. In the present disclosure, the mirror may be separated from the light ring in an embodiment of the present disclosure (FIG. 6) so that lighting is provided to illuminate the user's face only, and energy is not wasted lighting the reverse side of the mirror when it is not in use. A stationary light ring can be wider so that it may emit more diffuse, softer light, and a wider light ring may create a more impactful flash, resulting in higher quality selfies and video. A touch slider for brightness may be included on the back of a light ring in an embodiment of the present disclosure.

The light ring may be adjustable on one or more axes, such as for vertical pitch and/or height. However, the light ring may include a single side of a light element. The back of the light ring may include controls, such as touch controls or buttons or another type of control interface. It should be appreciated that the double-sided mirror/screen display may adjust with the ring light in embodiments of the present disclosure.

In embodiments of the present disclosure, rotation or swivel of the mirror/screen display may be voice-activated so that the user's hands may remain free for other tasks. The voice activation may provide a voice assistant in embodiments of the present disclosure.

The camera functionality (i.e., the camera or plurality of lenses and cameras provided) may be mounted behind the screen display, in the light ring surrounding the mirror, or anywhere on the mirror or companion devices in embodiments of the present disclosure. The light ring may remain in a fixed position so that it always faces the user. Wherever the plurality of cameras are mounted, they may be adjustable for left/right angles, vertical pitch, and rotation. In embodiments of the present disclosure, the screen display may be capable of swiveling so that the reverse side may be visible to the user. The reverse side may be a standard mirror or a magnifying mirror in embodiments of the present disclosure.

In some embodiments of the present disclosure, a user may be provided with an Internet connection which may be used to direct the user to a virtual community (which may be provided through a smartphone application) where the user can interact with other users by viewing, posting, and/or sharing content. Using an application interface for the virtual community, the user may mirror the image that is displayed on his/her smartphone to the virtual community. This image that is displayed on the smartphone may be the same image that is generated on the screen display of the mirror and/or the same image that the user may see in the reverse side mirror. It should be appreciated that the application interface may include or more buttons that may be used to capture a selfie, start video recording or livestreaming, select video that is livestreaming (or archived) by the user or by another user, communicate with other users through messaging (which may be textual and/or icon/graphic-driven), share content with other users/members of the virtual community, or other virtual communities that are known destinations where users post content, and/or report or flag inappropriate content posted by other users. Messages being posted by community users in response to what a user is livestreaming may be displayed in real-time on the user's mirror screen or may be livestreamed back to the user who is livestreaming (so that the livestreaming user can chat with other users while he/she is livestreaming).

The application may include the ability to translate words spoken by a livestreaming user into text lines that may be displayed in real-time on the screen display of the user's mirror such that all members of the virtual community can see a written translation of the spoken words. The app interface may include the ability to select a single user's profile and display information about that user, including but not limited to, how many likes they have, number of followers, their show times, other users they follow, and wall of all their posts. The app interface may display the number of community users who are viewing a livecast. The app interface may have a button to allow users who are viewing a livecast to speak or type written messages to the user who is livecasting; and if spoken in a language not known to the livecasting user, such messages may be translated to appear in a language known to the livecasting user. In general, the app interface may present the same visual and aural content on a device at the same time to all users of the virtual community (including visually to the user who is livecasting), and the livecasting user may also additionally see the same content displayed on their mirror screen.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A smart vanity mirror speaker system, the system comprising:
    a surface-mounted mirror-shaped display comprising:
        a liquid crystal display (LCD) screen on at least one side;
        one or more modules capable of capturing, livecasting, projecting, and/or recording a plurality of still images and photos, non-visible and heat spectrum images, polarization images, 3D images, audio inputs, and video of a user; and
        a swivel that connects to a single point or a plurality of sides of the surface-mounted mirror-shaped display, and provides for rotational adjustability of the surface-mounted mirror-shaped display;
    a structure connected to the surface-mounted mirror-shaped display, the structure provided with means to adjust a position of the surface-mounted mirror-shaped display and housing one or more acoustic chambers, the one or more acoustic chambers having one or more audio output devices integrated within the one or more acoustic chambers;
    at least one light source; and
    one or more companion devices connected wirelessly or electronically tethered but physically separable from the surface-mounted mirror-shaped display, the one or more companion devices provided with means to control functions being communicated by visual or other means to the user,
    wherein images displayed on the LCD screen are generated by one or more imaging devices that are configured to be physically adjustable and are mounted in a plurality of positions behind, and in proximity to, the LCD screen and within and to the one or more companion devices, and
    wherein the surface-mounted mirror-shaped display is capable of being adjusted at least in height and rotation relative to the structure housing the one or more acoustic chambers.

2. The system of claim 1 further comprising:
    one or more microphones connected wirelessly or electronically tethered but physically separable from the surface-mounted mirror-shaped display and provided with means to enhance capture, broadcasting, and recording of voice and audio inputs to accompany and contextualize at least one of the plurality of still images and photos, non-visible and heat spectrum images, polarization images, 3D images, audio inputs, and video of the user.

3. The system of claim 1, wherein the LCD screen is touch-enabled.

4. The system of claim 1, wherein the at least one light source surrounds the surface-mounted mirror-shaped display.

5. The system of claim 4, wherein the LCD screen rotates within the at least one light source upon one or more of voice activation and gesture activation.

6. The system of claim 1, wherein the at least one light source is separated from the surface-mounted mirror-shaped display.

7. The system of claim 1, wherein the LCD screen is provided with means to apply one or more of augmented reality (AR), polarization, and/or audio filters to at least one of the plurality of still images and photos, non-visible and heat spectrum images, polarization images, 3D images, audio inputs, and video of the user.

8. The system of claim 1, wherein at least one of the one or more companion devices is controlled by one or more means including physical buttons, a touchpad, voice control means, and gesture control means.

9. The system of claim 1, wherein the one or more companion devices provide means to select and operate display functions that may be available to the user comprising:
    display screen zoom; selection and application of AR filters; selection and application of polarization filters; selection and application of audio filters; display screen image color temperature adjustment; commencing and terminating user skin analysis; capturing display screen images; commencing and terminating video recording and livecasting; projecting rays of light to display an image or a video; audio capture; commencing and terminating voice calls; interactive chat options; viewing any content pushed to or acquired by the LCD screen; and scrolling and selecting control options displayed on the screen display, without requiring the user to have physical contact with one or more of the surface-mounted mirror-shaped display, the structure, and the at least one light source.

10. The system of claim 1, the one or more companion devices further comprising:
    a magnifying mirror attachment provided with means to attach to at least one of the LCD screen, the structure, and the at least one light source.

11. The system of claim 1, wherein the one or more companion devices function as a handheld beauty tool capable of delivering hair and skin therapies and beautification delivered by means comprising one or more of light therapy, ultrasonic facials, phototherapy, electrolysis, laser therapy, dermabrasion, mechanical action, product delivery and application, and makeup removal.

12. The system of claim 1, the one or more companion devices further comprising:
    one or more speakers that are capable of wirelessly connecting to the one or more audio output devices to create at least one of a stereo- and a surround sound transmission experience.

13. The system of claim 1, wherein the at least one light source is controlled by a least one of a touch slider and gesture control means located intuitively to the at least one light source.

14. The system of claim 1, wherein the at least one light source is adjustable on one or more axes.

15. The system of claim 1, wherein the at least one light source moves in concert with the surface-mounted mirror-shaped display.

16. The system of claim 1, wherein at least partial movement of the surface-mounted mirror-shaped display is voice-activated.

17. The system of claim 1, wherein image capture functionality is mounted in the at least one light source.

18. The system of claim 1, wherein the system includes an application interface to present the same visual and aural content at the same time to all users of a virtual community, including visually to the user who is livecasting, and the livecasting user also additionally sees the same content displayed on the screen display.

19. The system of claim 18, wherein the application interface includes one or more buttons to use to capture a selfie, start video recording or livestreaming, select video that is livestreaming (or archived) by the user or by another user, communicate with other users through messaging, share content with other users/members of the virtual community, or other virtual communities that are known destinations where users post content, and/or report or flag inappropriate content posted by other users.

20. The system of claim 19, wherein the application interface translates words spoken by a livestreaming user into text lines that are displayed in real-time on the LCD screen.

* * * * *